A. C. BYERS AND W. B. FRITZE.
FLYTRAP.
APPLICATION FILED AUG. 25, 1916.
1,335,041.                          Patented Mar. 30, 1920.
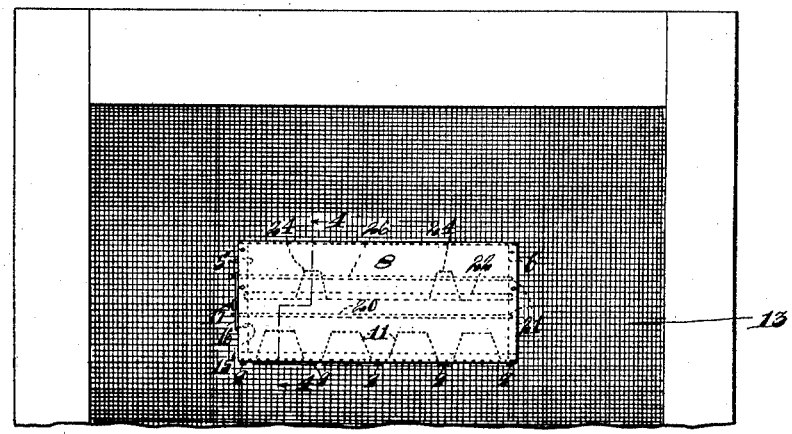
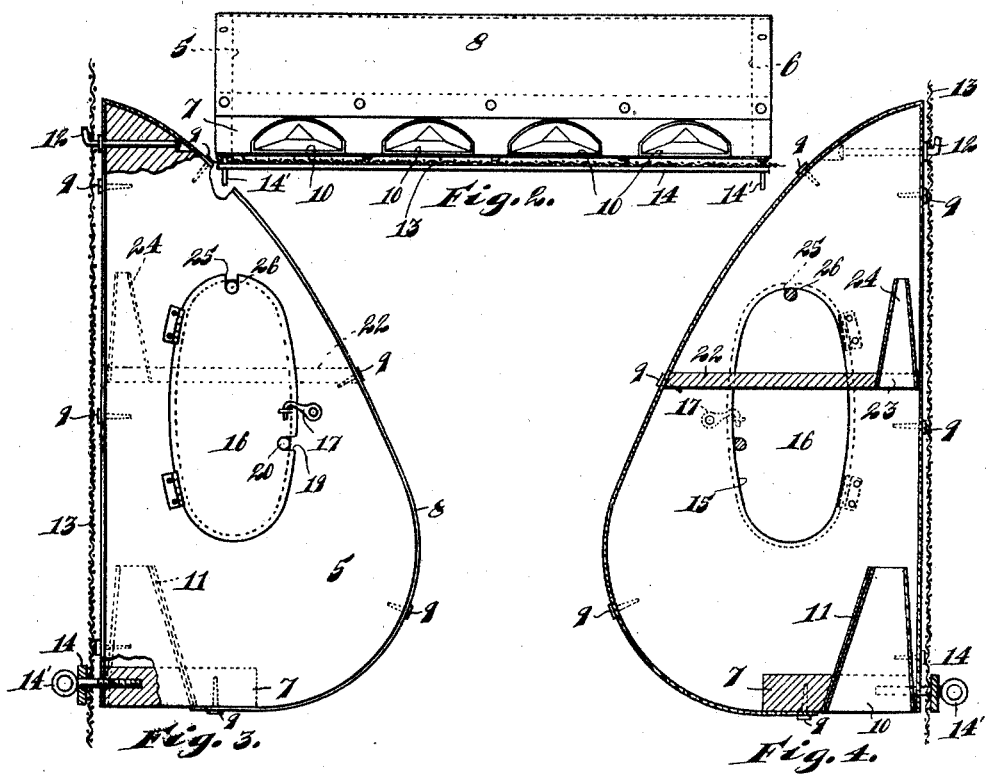

UNITED STATES PATENT OFFICE.

ANDREW C. BYERS AND WILLIAM B. FRITZE, OF FORRESTON, ILLINOIS.

FLYTRAP.

1,335,041.  Specification of Letters Patent.  Patented Mar. 30, 1920.

Application filed August 25, 1916. Serial No. 116,910.

*To all whom it may concern:*

Be it known that we, ANDREW C. BYERS and WILLIAM B. FRITZE, citizens of the United States, and residents of Forreston, county of Ogle, and State of Illinois, have invented certain new and useful Improvements in Flytraps, of which the following is a specification.

Our invention relates to improvements in fly traps and has for its object the provision of an improved construction of this character which is highly efficient in use and capable of economical manufacture.

The invention consists in the combinations and arrangements of parts hereinafter described and claimed.

The invention will be best understood by reference to the accompanying drawings forming a part of this specification, and in which, Figure 1 is a face view of the upper portion of an ordinary screen door equipped with a fly trap embodying our invention, Fig. 2, an enlarged bottom plan view of the trap, Fig. 3, an enlarged end view of the trap shown partially in section, and Fig. 4, an enlarged transverse section taken on line 4—4 of Fig. 1.

The preferred form of construction, as illustrated in the drawings, comprises two end members 5 and 6 made of wood and substantially semi-heart shaped, as indicated. A base bar 7 connects the rear lower portions of the end members 5 and 6 and a sheet of transparent celluloid 8 is secured to said base bar and around the edges of said end members by means of tacks 9, as shown. The base bar 7 is provided with a plurality of entry openings 10 and substantially conically shaped entry members 11, made of transparent celluloid, are fitted in said openings and extend upwardly into the body of the trap, as shown. Hooks 12 are provided at the upper rear sides of the end members 5 and 6 and are adapted to engage through the meshes of an ordinary wire screen 13 of an ordinary wire door or the like. The lower rear portions of the end members 5 and 6 are also secured to the screen 13 by means of a clamping bar 14 secured in position by means of screw eyes 14'. The entry openings 10 are arranged at the extreme rear of the base bar 7 and at their rear edges are substantially flush with the screen 13 so as to permit of ready access of flies to the interior of the trap without material change of course as they travel upwardly on the screen 13.

The end member 5 is provided with a discharge opening 15 and an oval metallic door 16, which is somewhat larger than the opening 15, and is locked in closed position by means of a lock 17 as indicated. A notch 19 is provided in one edge of said closure to receive a bait bar 20, as indicated, the notch 19 being deep enough to permit of the insertion of said rod 20 through the opening 15 and into a socket 21 provided in the opposite end member 6. The bait may be applied by rubbing the same on the rod 20, or by hanging the same thereon, as desired.

The construction set forth, having its front, top, rear and a large portion of its bottom walls transparent, will be practically as well lighted as any of the surrounding objects. We have discovered by experiment, that flies naturally tend to avoid darkened or shaded places unless strongly drawn thereto, and also always tend to travel upwardly upon any surface upon which they may light, so that flies will enter the trap from the bottom without hesitation. Taking advantage of these peculiarities of the flies, is also greatly facilitated by making the entry members 11 also transparent and also, by arranging the entry openings substantially flush with the screen, so as to avoid any abrupt change of course on the part of the flies as they enter the trap. For these reasons the trap may be used effectively without any bait, but, of course, it is better to use some form of bait. By making the walls of celluloid, a transparent imperforate material, all parts of the flies, and any dirt, filth or contamination carried thereby will be retained in the trap, thus tending toward sanitation.

To adapt the trap for a more secure retaining of the flies, especially the small flies, a horizontal partition 22 is provided therein, dividing the interior of the trap into two separate compartments, said compartments being arranged to traverse the door opening 15 so as to give access to each compartment through said door. The upper compartment is provided with entry openings 23 closely adjacent to the rear wall of the trap and with entry cones 24 of transparent celluloid giving access to the upper compartment. The door 16 is also provided with an additional notch 25 to receive a bait bar 26 for the upper compartment. The bait bars also serve to lock the door 16 in closed position.

When it is desired to empty the flies from the trap, the trap may be plunged in boiling water which will effectually kill the flies and also tend to sterilize or desinfect the trap to prevent the spread of disease from the flies.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A fly trap comprising two wooden end pieces substantially semi-heart shaped, there being an opening in one of said end pieces; a swinging closure for said opening, there being a notch in one edge of said closure; a bait rod fitting through said notch and through said opening and detachably engaging the opposite end; a base bar securing said end members together; walls for said trap consisting of celluloid secured to said base bar and around the edges of said end pieces; and one or more entry members formed of celluloid passing upwardly through said base bar, substantially as described.

2. A fly trap having end pieces and a horizontal partition dividing the same into upper and lower chambers, there being an opening in one of said end pieces leading into both of said chambers; a swinging closure for said opening; and a bait rod traversing each of said chambers, there being notches in said closure for the reception of said bait rods, substantially as described.

In testimony whereof we have signed our names to this specification in the presence of two subscribing witnesses.

ANDREW C. BYERS.
WILLIAM B. FRITZE.

Witnesses:
E. L. RORERTSON,
HERMAN BRANDT.